(12) United States Patent
Hohenstein

(10) Patent No.: US 9,772,055 B2
(45) Date of Patent: Sep. 26, 2017

(54) COUPLING FOR PIPE ELEMENTS

(71) Applicant: GEMUE Gebr. Mueller Apparatebau GmbH & Co. Kommanditgesellschaft, Ingelfingen (DE)

(72) Inventor: Lukas Hohenstein, Kupferzell (DE)

(73) Assignee: GEMUE Gebr. Mueller Apparatebau GmbH & Co. Kommand, Ingelfingen (DE)

(*) Notice: Subject to any disclaimer, the term of this patent is extended or adjusted under 35 U.S.C. 154(b) by 0 days.

(21) Appl. No.: 15/262,295

(22) Filed: Sep. 12, 2016

(65) Prior Publication Data
US 2017/0067584 A1    Mar. 9, 2017

Related U.S. Application Data

(63) Continuation of application No. PCT/EP2015/054529, filed on Mar. 4, 2015.

(30) Foreign Application Priority Data

Mar. 12, 2014  (DE) ........................ 10 2014 204 565

(51) Int. Cl.
F16L 25/00   (2006.01)
F16L 19/02   (2006.01)
(52) U.S. Cl.
CPC ................. F16L 19/0212 (2013.01)
(58) Field of Classification Search
CPC ....................................................... F16L 23/16
(Continued)

(56) References Cited

U.S. PATENT DOCUMENTS 1,302,314 A * 4/1919 Cornell ............... F16L 27/0816
  285/279
1,537,755 A   5/1925 Dowling
(Continued)

FOREIGN PATENT DOCUMENTS

CH        233249         7/1944
DE       69400982        6/1997
(Continued)

OTHER PUBLICATIONS

International Search Report for International Application PCT/EP2015/054529, dated May 28, 2015.

Primary Examiner — Aaron Dunwoody
(74) Attorney, Agent, or Firm — Burris Law, PLLC

(57) ABSTRACT

The invention relates to a coupling for releasably connecting pipes or pipe-like elements in a fluid-tight manner, having a first coupling part and a second coupling part which are connectable via a screw nut or the like, wherein the coupling parts are each provided with a radially outwardly extending flange and the flanges have end faces which are provided with a profile for sealing off the coupling, wherein the profile comprises at least one circumferential groove and at least one circumferential protrusion engaging in the groove, said groove and protrusion forming a fluid-tight seal between one another in the coupled state, and wherein the protrusion comprises a lateral sealing face which has an outwardly bulging shape in cross section, and wherein the groove has a corresponding lateral counterpart sealing face that is inclined with regard to the longitudinal axis of the coupling, such that, in the installation position, the sealing face of the protrusion is pressed against the counterpart sealing face of the groove.

10 Claims, 2 Drawing Sheets

Figure 2:
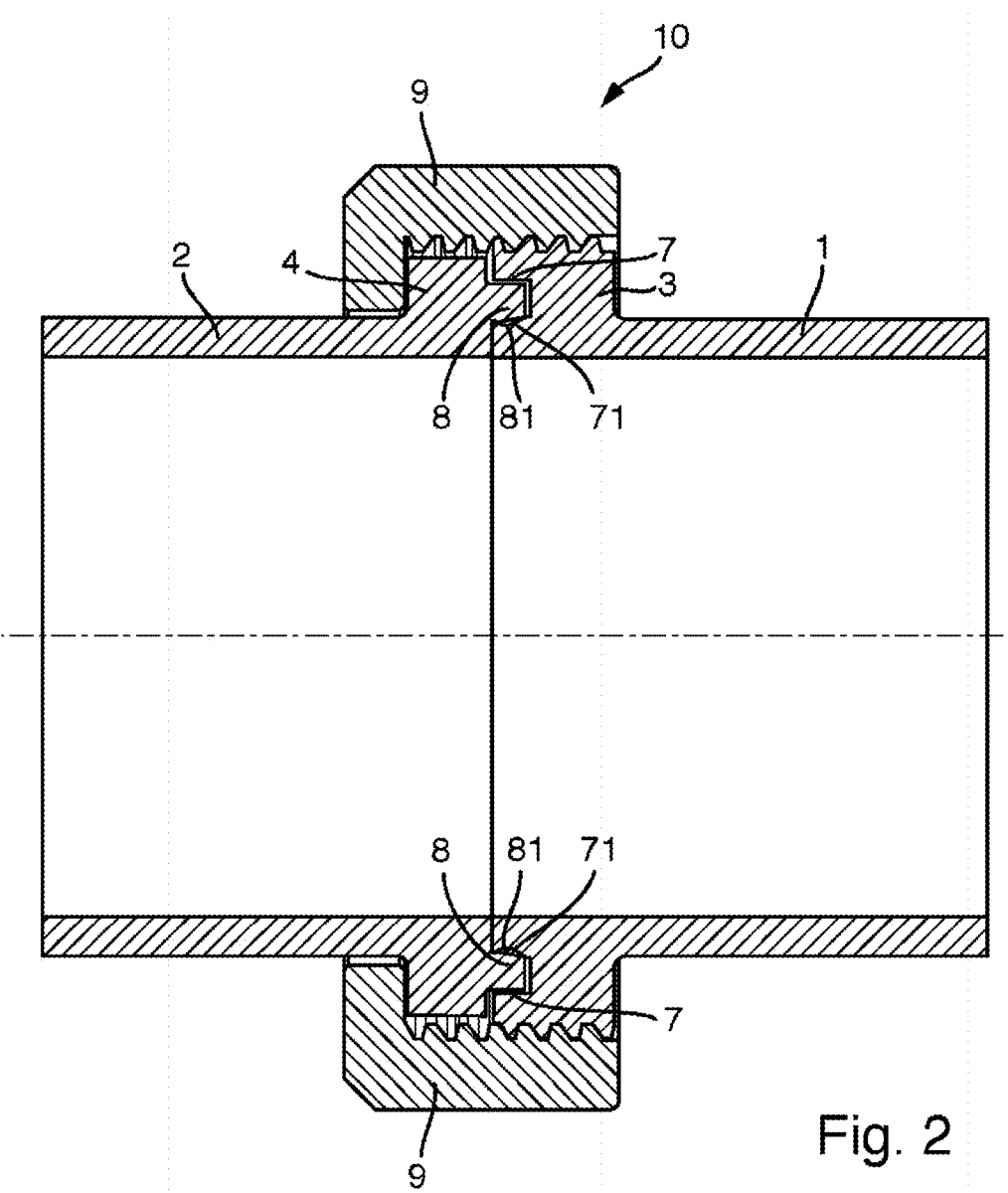

(58) Field of Classification Search
USPC .................. 285/9.2, 330, 331, 332.1, 386
See application file for complete search history.

(56) References Cited

U.S. PATENT DOCUMENTS

| | | | | |
|---|---|---|---|---|
| 2,238,462 A | * | 4/1941 | Crepeau | F16L 19/0225 285/331 |
| 2,284,216 A | | 5/1942 | Kunkel | |
| 2,366,798 A | * | 1/1945 | Lilly | F16L 17/035 285/111 |
| 2,443,187 A | * | 6/1948 | Hobbs | F16L 17/08 277/622 |
| 2,652,268 A | * | 9/1953 | Goode | F16L 19/0212 285/110 |
| 2,695,184 A | * | 11/1954 | Hobbs | F16L 23/0283 220/327 |
| 3,181,897 A | * | 5/1965 | Krayenbuhl | F16L 37/148 285/106 |
| 3,429,581 A | * | 2/1969 | Himmel | F16J 15/04 277/625 |
| 4,525,001 A | * | 6/1985 | Lumsden | B23P 11/022 285/328 |
| 4,611,838 A | | 9/1986 | Heilmann | |
| 5,312,377 A | * | 5/1994 | Dalton | A61M 39/10 285/331 |
| 2002/0180162 A1 | | 12/2002 | Jost | |

FOREIGN PATENT DOCUMENTS

| | | |
|---|---|---|
| DE | 60319352 | 2/2009 |
| FR | 712765 | 10/1931 |
| GB | 184863 | 5/1921 |
| GB | 487796 | 12/1938 |

* cited by examiner

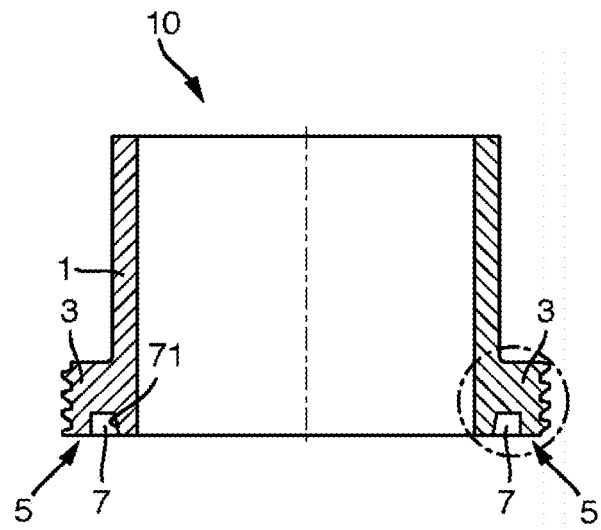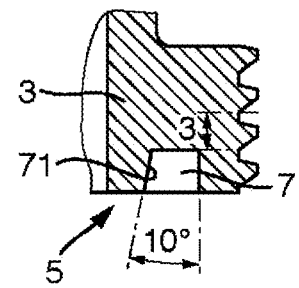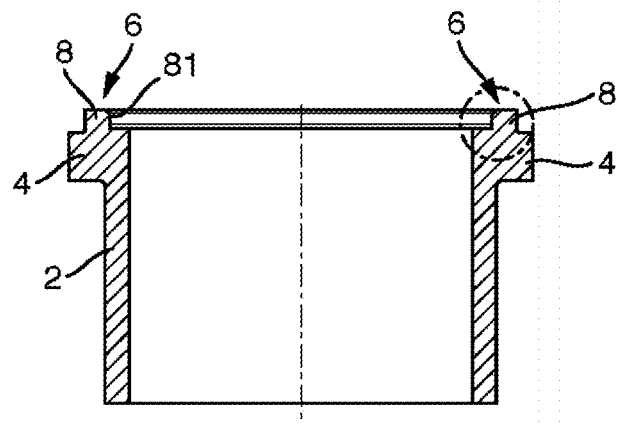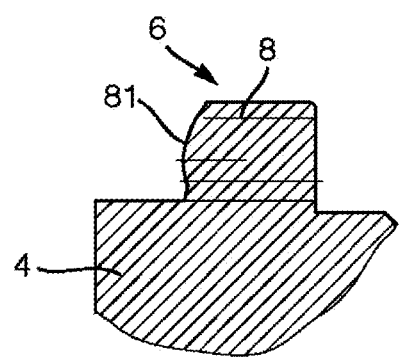
Fig. 1
Fig. 1a
Fig. 1b

COUPLING FOR PIPE ELEMENTS

CROSS-REFERENCE TO RELATED APPLICATIONS

This application is a continuation of International Application No. PCT/EP2015/054529, filed on Mar. 4, 2015, which claims the benefit of DE 102014204565.7, filed on Mar. 12, 2014. The disclosures of the above applications are incorporated herein by reference.

FIELD

The present invention relates to a coupling for detachably connecting tube elements in a fluid-tight manner, with a first and a second coupling part. At least one of the coupling parts is provided with an external thread so that the coupling parts can be connected to one another by means of an outer nut.

BACKGROUND

The statements in this section merely provide background information related to the present disclosure and may not constitute prior art.

In order to seal such couplings, it is known to insert a seal, such as an O-ring, between the coupling parts, which O-ring is compressed during the screwing-together of the coupling so that the connection is sealed. A problem with such sealing systems for tube couplings with an O-ring is that the O-ring must be positioned correctly at its desired location in order to achieve a sufficient seal. Furthermore, such O-rings are generally made of a compressible, elastic material, which in some cases is prone to damage caused by a process fluid. Such O-rings are also subject to aging, which, in time, can result in a leak in the coupling.

On the other hand, couplings for tube elements are known, which couplings are provided on an end surface of a coupling flange with grooves, with which protruding tongues engage so that a sealing of the coupling is achieved by means of the form fit. In such tube couplings, the groove and the tongue or the projection must be produced with very tight tolerances in order to achieve a sufficient sealing effect. Furthermore, several such grooves and tongues are generally required in order to avoid an undesired escape of the fluid and a leak in the tube coupling.

SUMMARY

In contrast thereto, it is the aim of the invention to provide a coupling for tube elements for a fluid-tight seal, in which coupling an effective and long-lasting seal with a design configuration as simple as possible is achieved, without an additional separate sealing element.

This aim is achieved with a coupling having the features of claim 1. Advantageous embodiments and developments of the invention are the subject matter of the dependent claims.

The coupling according to the invention for detachably connecting tubes or other tube-shaped elements comprises a first coupling part and a second coupling part, which can be connected by means of a nut or something similar, wherein the coupling parts are respectively provided with a flange that extends radially outward, and the flanges comprise end surfaces that are provided with a profile for sealing the coupling. The profile on the end surfaces of the coupling parts comprises at least one circumferential groove and at least one circumferential projection that engages with the groove, which, in the coupled condition, i.e., in the closed condition of the coupling, produce a fluid-tight seal between themselves, wherein the coupling according to the invention is characterized in that the projection has a truncated, cone-shaped cross-section such that a sealing surface inclined relative to the longitudinal axis of the coupling is provided for abutting against a counter sealing surface in the groove. When the coupling is closed by screwing the coupling parts together, the inclined sealing surface of the projection is increasingly pressed against the counter sealing surface so that a very good seal is achieved without an additional sealing element. By means of the inclined sealing surface of the projection, a type of planar press fit against the counter sealing surface is produced, which press fit reliably and in the long run prevents a process fluid from escaping. By means of the inclined sealing surface, which is inclined at an angle relative to the longitudinal axis of the coupling, the sealing effect is increasingly enhanced by screwing together the coupling parts themselves. Since no separate sealing element, such as an elastomer O-ring, need be inserted between the coupling parts, the coupling is fluid-tight in the closed condition in any situation. The sealing means, i.e., the projection and the correspondingly shaped groove, are provided on the flanges themselves of the coupling parts. In order to achieve a reliable seal, the coupling according to the invention does not require any processing of the sealing profile with tight tolerances, as was absolutely required in such tube couplings in the prior art. By means of the inclined sealing surface on the projection of the sealing profile of the coupling, a reliable seal is achieved in any situation of a joining of the coupling parts. The projection with the inclined sealing surface can be produced of the same material, i.e., unitary with the respective coupling part. Alternatively, the projection can also be made of a different material than the material of the respective coupling part, wherein the projection is then preferably also integrally molded onto the flange. In any case, the projection is firmly connected to the flange of the coupling part so that a separate component does not need to be inserted when connecting the coupling parts.

In doing so, the sealing surface of the projection has an outwardly curved cross-sectional shape. When the coupling is closed, and the coupling parts are firmly screwed together, the curved shape of the inclined sealing surface of the projection is pressed into the groove. With the curved part of the projection pressed into the groove, an even tighter sealing of the coupling is achieved. When the coupling parts of the tube coupling are made from a plastic material, for example, the curved surface is pressed into the groove as a highly efficient sealing surface when the coupling is firmly screwed together. As a result of the elasticity of the material of the projection, the firm screwing-together of the coupling parts thus directly produces a very good sealing between the projection and the groove in the counter flange of the other coupling part.

Only for the sake of completeness it is to be noted that, departing from claim 1, of course an obvious and equivalent embodiment having the same effect consists in that the lateral sealing surface on the projection is straight and the corresponding lateral counter sealing surface in the groove is curved inwardly.

According to an advantageous embodiment of the invention the counter sealing surface of the groove on the flange of the coupling part is formed with a corresponding counter slope with respect to the inclined sealing surface of the projection. Upon closing the coupling, the inclined sealing surface and the inclined counter sealing surface of the groove are continuously pressed against each other over a relatively large portion, such that an even bigger sealing effect is achieved. The sealing surface and inclined counter sealing surface, which are pressed together, herewith form a type of firm form fit, which is reliably and at long term fixed by means of the pressure by screwing together the coupling parts. By consequence, the sealing of the coupling is safely ensured over a long period of time and also with aggressive process fluids.

According to another advantageous embodiment of the invention, the groove comprises a truncated, cone-shaped cross-section with a groove wall parallel to the longitudinal axis of the coupling and a groove wall inclined relative thereto. With such a cross-section shape, a type of trapezoidal groove is realized, into which a projection with a correspondingly truncated, cone-shaped cross-section can be inserted in a precisely fitting manner. The groove wall parallel relative to the longitudinal axis, in interaction with a straight wall of the projection, constitutes a type of guide when connecting the coupling parts, whereas the inclined groove wall with the inclined sealing surface constitutes a highly efficient sealing means when screwing together the coupling parts. Unlike with linear combinations of grooves and projections—or tongues, as they are known from the prior art—the sealing effect is further enhanced in this case without the sealing profile on the end surfaces of the flanges having to be produced with very precise, tight tolerances.

According to an advantageous embodiment of the coupling according to the invention, a gap exists between the projection and the groove on the radial outer face and/or on the end surface in the closed condition of the coupling. By means of the gap between the outer face or end surface of the projection and the inner walls of the groove, a reliable and very tight press fit in the form of a sealing profile is achieved. For this purpose, the projection and the groove have a sufficient clearance between the components, except for the inclined sealing surface and the counter sealing surface used for abutting against the sealing surface. Such a gap can, for example, be provided on the order of magnitude of a few millimeters, and preferably of 0.5 mm. In this case, the sealing point of the compression seal according to the invention is on the inner surface of the groove and the projection, i.e., at the point facing the interior of the tube-lines, so that the sealing is effected at a location that is close to the fluid. With such a gap according to the invention between the groove and the projection on the outer face, or on the outer face and on the end surface, a certain clearance furthermore exists between the pressed-in projection and the groove, which makes producing the sealing effect even easier. The two coupling parts simply have to be screwed together firmly by means of a sleeve nut, for example, and herewith the sealing develops automatically.

According to another advantageous embodiment of the invention, the inclined sealing surface of the projection has, on the one coupling part, an inclination angle that differs from that of the inclined groove wall. With such differently inclined or slanted shapes on the sealing surface on the one hand, and on the counter sealing surface on the inside of the groove on the other hand, a progressively increasing compression effect can be achieved, which is produced when pressing the projection into the groove. The position of the sealing can thereby deliberately be moved further inward or further outward from the groove, depending upon the requirements and intended use of the coupling. With a differently inclined sealing surface relative to the counter sealing surface, the pressing-on of the sealing surface can also be further improved so that an improved sealing can thereby be achieved. The difference in the incline can preferably be a few degrees, such as 2 to 5 degrees, relative to the longitudinal axis of the coupling.

According to another advantageous embodiment of the invention, the projection consists at least in sections of a plastically or elastically deformable material. When the projection provided on the flange of the one coupling part is made in sections—namely, in the region of the sealing surface—from a deformable material, the sealing surface on the other flange of the other coupling part can be deliberately deformed when the projection is pressed onto and into the groove. With such a deliberate deformation, a further improved sealing of the coupling in the closed condition is achieved. According to an alternative embodiment in this respect of the coupling according to the invention, the projection consists of a different material than the rest of the coupling. A projection according to this embodiment can, for example, be made of an elastically resilient material, so that the pressing of the projection with the inclined sealing surface onto the counter sealing surface in the groove can be further improved by means of a spring effect. The projection and the rest of the coupling can, for example, be made of different plastic materials, wherein the projection is preferably directly cast on the flange of the respective coupling part.

According to another advantageous embodiment of the invention, the counter sealing surface has a curved, inclined shape on the inside of the groove. In this case, the counter sealing surface of the groove has a slightly outwardly curved shape that is deliberately compressed when the coupling parts are connected and screwed together. The curved shape of the inclined counter sealing surface has the advantage that the sealing is made even more reliable thereby. Similarly to the curved shape of the sealing surface, in this case, the counter sealing surface is firmly compressed during the screwing together of the coupling parts and slightly deformed, for example, elastically or plastically. The occurrence of leaks is, therefore, reliably avoided in the coupling according to the invention. In this case, the sealing surface can once again also be curved or linearly inclined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 a cross-sectional view of an exemplary embodiment of a coupling according to the invention for tube elements in the separated condition without sleeve nut;

FIG. 1a a sectional view of a detail of the projection with the sealing surface according to the exemplary embodiment;

FIG. 1b a sectional view of a detail of the groove with the counter sealing surface according to the exemplary embodiment; and FIG. 2 a cross-sectional view of the exemplary embodiment of the coupling according to the invention for tube elements in the mounted condition.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In a cross-sectional view, FIG. 1 shows an exemplary embodiment of a coupling 10 according to the invention for tubelines in a separated condition. The cross-sectional views of FIG. 1a and FIG. 1b show enlarged details of the coupling 10 in the region of the projection 8 and the groove 7. The coupling 10 is a so-called screw connection for tube sections, which is also referred to as a union. It is used to detachably connect different tube elements, such as fittings, in a tubeline system or something similar. The coupling 10 according to the invention comprises a first coupling part 1 and a second coupling part 2, which are firmly and detachably connected to one another in the mounted condition. For this purpose, the first coupling part 1 comprises an external thread on a flange 3 radially protruding outward, and the second coupling part 2 is also formed with a flange 4 facing radially outward. A sleeve nut (not shown in FIG. 1) is slid over the second coupling part 2 and screwed together with the external thread of the flange 3 of the first coupling part 1 so that the respective ends of the first and second coupling part 1, 2 then abut against one another or are engaged with one another. In order to make possible a fluid-tight connection with the coupling 10, specific profiles are respectively provided for sealing on the end surfaces of the flanges 3, 4. According to the exemplary embodiment shown of the invention, a circumferential groove 7 is formed in the flange 3, and, in the flange 4 of the second coupling part 2, there is a correspondingly shaped projection 8. The end surfaces 5, 6 of the coupling parts 1, 2 are thus formed with a specific sealing profile. According to the present invention, the circumferential projection 8 on the flange 4 of the second coupling part 2 is provided with a sealing surface 81 that faces radially inward and extends in a slightly inclined or slanted manner relative to the longitudinal axis of the coupling 10. The projection 8 thus has a substantially trapezoidal-shaped cross-section. On the radially outer side, the projection is formed with one wall parallel to the longitudinal axis of the coupling 10, whereas, on the radially inner side, an inclined sealing surface 81 is provided, which is pressed against a counter sealing surface 71 of the circumferential groove 7 in the mounted condition. The specific shape according to the invention of the sealing profile of the coupling 10 can be seen better in the detailed views of the cross-sections of FIG. 1a and FIG. 1b.

As shown in FIG. 1a and FIG. 1b, in this exemplary embodiment, the inclined sealing surface 81 of the projection 8 is realized in a shape that is slightly curved outward in the central region. The groove 7, used for inserting the projection 8, in the flange 3 of the first coupling part 1 is correspondingly provided with an inclined counter sealing surface 71, which extends here in an inclined manner at an angle of approximately 10° with respect to the other groove wall. When the projection 8 is inserted into the groove 7 in the assembled condition of the coupling 10, the inclined sealing surface 81, which is curved slightly outward, is pressed against the counter sealing surface 71 so that an effective sealing of the coupling 10 takes place as a result of the press fit. For this purpose, the groove 7 and the projection 8 are adapted to one another in their shape, position, and dimensions such that the curved shape of the inclined sealing surface 81 on the inside of the groove 7 is virtually pressed in when the coupling parts 1, 2 are screwed together. As a result, no additional sealing means, such as an O-ring seal made of elastomer or something similar, is required to produce a fluid-tight sealing at the connection point of the coupling 10. In addition, according to the invention, the projection 8 and the groove 7 need not be produced with very tight tolerances, as was required in such form-fitting seals with linearly shaped grooves and projections known from the prior art. In the exemplary embodiment illustrated here of the coupling 10 according to the invention, the sealing surface 81 is not only slightly inclined, e.g., by 10°, relative to the longitudinal axis of the coupling and thus to the linear side surface of the projection 8, but also slightly curved or bulged outward. Alternatively, the sealing surface 81 can, however, also be formed as a linear surface without any curvature. Unlike as shown here, the shape of the groove 7 can furthermore also be provided with a linear or a curved counter sealing surface.

In any case, the seal according to the invention by means of a specifically adapted profile of the end surfaces 5, 6 of the flanges 3, 4 of the coupling parts 1, 2 offers a highly effective and long-lasting sealing function as a result of the pressed-in, inclined sealing surface 81 interacting with the counter sealing surface 71 in the groove 7. The position of the seal according to the invention is on the inside of the coupling 10 close to the connection point of the flanges 3, 4, so that a sealing is effected close to the process fluid flowing in the coupling 10. Since no separate sealing element, such as an O-ring or something similar, must be inserted, a reliable seal is ensured in any case. The seal is automatically produced when screwing together the coupling parts 1, 2 by the accompanying compression of the sealing surface 81 on the inside of the groove 7. A mistake in the installation and the insertion of sealing rings, etc., can thus not occur. This type of a seal according to the invention is also not prone to damage caused by abrasive process media, since it is formed virtually integrally as a sealing profile on the end surfaces 5, 6 of the respective flanges 3, 4.

In the exemplary embodiment shown here, the external thread for the screw connection is provided on the outer face of the flange 3 of the first coupling part 1. Naturally, the external thread can also be provided on the flange 4 of the second coupling part. The shapes of the cross-sections of the projection 8 and of the groove 7 can also be different from the shapes of this embodiment, and, for example, both sides of the projection 8—and, accordingly, both groove walls of the groove 7—can have a slightly inclined shape, e.g., with an inclination of 5° to 15°.

The cross-sectional view of FIG. 2 shows the coupling 10 according to the invention in an assembled, sealed condition. A sleeve nut 9 is slid over the second coupling part 2, and its internal thread is screwed together with the external thread of the flange 3 of the first coupling part 1. In this way, the circumferential projection 8 is inserted into the correspondingly positioned groove 7 of the flange 3. In the process, the radially inner side of the outwardly curved, inclined sealing surface 81 of the projection 8 is pressed against the counter sealing surface 71 of the groove 7. By means of this pressing-in of the projection 8, a reliable seal of the coupling 10 is achieved at the connection point. The cross-section of the projection 8 is shaped as a type of trapezoidal cross-section, i.e., it has on one side a linear surface (on the outside) extending parallel to the longitudinal axis of the coupling 10 and an inclined sealing surface 81, which, in this exemplary embodiment, is inclined by approximately 10° relative to the linear surface. The shape of the groove 7 on the inner surface is correspondingly also provided with an inclined counter sealing surface 71 and an opposite, linear groove wall (on the outside). As can be seen in FIG. 2, in this exemplary embodiment, in the mounted condition of the coupling 10, a small gap exists at the end surface and the outer face between the projection 8 and the groove 7.

Such a gap of, for example, 0.5 mm to 1.5 mm makes possible a reliable and firm pressing-in of the curved, inclined sealing surface 81 at the connection between the first coupling part 1 and the second coupling part 2. The projection 8 is directly integrally connected to the flange 4, i.e., the projection 8 is part of and made of the same material as the rest of the coupling part 2. According to an alternative embodiment, the projection 8 can also be made from a different material than the rest of the coupling part 2, such as from an elastically deformable material and/or a slightly resilient material, whereby the sealing effect is further improved. Instead of a projection 8 and a correspondingly provided circumferential groove 7, several projections and grooves can also be provided according to the invention next to each other in the respective flanges 3, 4, e.g., so as to offer an even better sealing at several points on the flanges 3, 4 of the coupling 10. The coupling 10 according to the invention is easy to handle and automatically offers a reliable seal upon assembly, without a precise positioning having to be taken into consideration when inserting the parts. Nonetheless, the coupling 10 according to the invention can at any time be removed again, e.g., in order to exchange components in a tubeline system. Last but not least, the coupling parts 1, 2 are precisely positioned in their relative position to one another by means of the inclined sealing surface 81 according to the invention on the projection 8 and the corresponding counter sealing surface 71 in the groove 7. In addition to the sealing, the sealing profile with a projection 8 and a groove 7 thus has the advantage of a precise positioning. Both the projection 8 and the groove 7 can alternatively be provided with inclined surfaces or inclined side walls on both sides, whereby the sealing is further improved, since, in this case, both on the radially outer side and on the radially inner side, sealing points are respectively formed by pressing the projection 8 into the groove 7. In this case, the shape of the cross-section of the projection 8 is an approximately trapezoidal shape, but can vary as long as there is at least one inclined sealing surface 81 that extends in a slightly inclined or slanted manner relative to the longitudinal axis of the coupling 10.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A coupling for detachably connecting tubes or tube-shaped elements in a fluid-tight manner, the coupling comprising:
a first coupling part and a second coupling part, which can be connected by a connection means, wherein the coupling parts are respectively provided with a flange extending radially outward, and the flanges have end surfaces that are provided with a profile for sealing the coupling,
wherein the profile comprises:
at least a circumferential groove and at least a circumferential projection engaging with the groove, which, in a coupled condition, produce a fluid-tight seal between themselves,
characterized in that the projection has a first side surface and a second side surface, wherein the first side surface extends straight and in parallel to a longitudinal axis of the coupling, and wherein the second side surface has a cross-sectional shape that is at least in sections curved outwardly, whereby a lateral sealing surface is formed, and that the groove has a first side surface and a second side surface, wherein the first side surface of the groove extends straight and in parallel to the longitudinal axis of the coupling, and wherein the second side surface forms a lateral counter sealing surface that corresponds to the second side surface of the projection and that is inclined relative to the longitudinal axis of the coupling, such that, in the installed position, the outwardly curved, lateral sealing surface of the projection is pressed against the lateral counter sealing surface of the groove, and the lateral sealing surface of the projection and the first side surface of the groove are offset in a same radial region of the coupling.

2. The coupling according to claim 1, characterized in that the groove comprises a truncated cone-shaped cross-section with the first side surface of the groove parallel to the longitudinal axis of the coupling and the second side surface of the groove inclined relative thereto.

3. The coupling according to claim 1, characterized in that the second side surface of the projection is inclined and the projection has a truncated cone-shaped cross section.

4. The coupling according to claim 1, characterized in that a gap exists between the projection and the groove on a radial outer face in the coupled condition of the coupling.

5. The coupling according to claim 1, characterized in that the second side surface of the projection has an inclination angle that is different from that of the second side surface of the groove.

6. The coupling according to claim 1, characterized in that the projection consists at least in sections of a plastically or elastically deformable material.

7. The coupling according to claim 1, characterized in that the projection consists of a different material than the rest of the coupling.

8. The coupling according to claim 1, characterized in that the second surface of the groove has a curved, inclined shape.

9. The coupling according to claim 1, wherein the connection means is a nut.

10. The coupling according to claim 1, wherein a gap exists between the projection and the groove on an end surface in the coupled condition of the coupling.

* * * * *